(12) United States Patent
Chang et al.

(10) Patent No.: US 8,737,818 B2
(45) Date of Patent: May 27, 2014

(54) SCENE SEGMENT PLAYING SYSTEM, METHOD AND RECORDING MEDIUM THEREOF

(71) Applicant: Institute for Information Industry, Taipei (TW)

(72) Inventors: Chia-Hsiang Chang, Taipei (TW); Emery Jou, Taipei (TW); Jing-Fung Chen, New Taipei (TW); Pei-Wen Huang, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 13/714,135

(22) Filed: Dec. 13, 2012

(65) Prior Publication Data

US 2014/0105571 A1    Apr. 17, 2014

(30) Foreign Application Priority Data

Oct. 17, 2012 (TW) .............................. 101138298 A

(51) Int. Cl.
*H04N 5/76* (2006.01)
*H04N 9/80* (2006.01)

(52) U.S. Cl.
USPC ........... 386/299; 386/239; 386/240; 386/291; 386/296; 386/297

(58) Field of Classification Search
USPC .................. 386/239, 240, 291, 296, 297, 299
See application file for complete search history.

(56) References Cited

U.S. PATENT DOCUMENTS

| 2001/0049826 | A1* | 12/2001 | Wilf .............................. 725/120 |
| 2002/0133486 | A1* | 9/2002 | Yanagihara et al. .............. 707/3 |
| 2005/0125419 | A1* | 6/2005 | Mizutani et al. ................ 707/10 |

FOREIGN PATENT DOCUMENTS

KR    1020100134610 A    12/2010

* cited by examiner

*Primary Examiner* — Daquan Zhao
(74) *Attorney, Agent, or Firm* — Muncy, Geissler, Olds & Lowe, P.C.

(57) ABSTRACT

A scene segment playing system, a scene segment playing method and a recording medium thereof are provided. The system includes media supply equipment, a description generating server, a scene server, and an end device. The media supply equipment is used for supplying media data. Upon receiving the media data, the scene server supplies scene description data corresponding to the media data. The scene server acquires the media data and interval information supplied by the end device, and retrieves scene segment data from the media data according to a comparison result of the interval information and the scene description data, and outputs the scene segment data to the end device for playing.

21 Claims, 12 Drawing Sheets

| Countdown | Description of Team A | Score of the Third Quarter | Description of Team B |
|---|---|---|---|
| 11:39 | No.2 player second a three-point shot | 55-44 | |
| 11:13 | Break off | 55-44 | No.4player substituted by No.6player |
| 10:50 | No.6 player fouled | 55-44 | |
| 10:50 | | 55-45 | No.7player made a free throw |
| 10:50 | | 55-45 | No.7player missed two free throws |
| 10:49 | | 55-47 | No.6player scored a rebound goal |
| 10:26 | No.13player missed a layup | 55-47 | |
| 10:25 | | 55-47 | No.14 player fought for a rebound |
| 10:02 | | 55-47 | No.2 player2 missed a layup |
| 10:01 | No.6player fought for a rebound | 55-47 | |
| 09:39 | No.2player scord a layup | 57-47 | |
| 09:16 | | 57-50 | No.6player scored a three-point shot |
| 08:58 | No.2player scored a three-point shot | 60-50 | |
| 08:46 | No.13player passed the ball to No.2player | 60-50 | No.7 player made a turnover |
| 08:44 | No.2player scord a layup | 62-50 | |
| 08:30 | | 62-50 | No.6player missed a three-point shot |
| 08:29 | | 62-52 | No.7player scored a rebound goal |
| 08:07 | No.6player scord a layup | 64-52 | |
| 07:54 | | 64-52 | No.6player missed a three-point shot |
| 07:53 | | 64-52 | No.7player got a rebound and passed the ball to No.6player |
| 07:47 | | 64-55 | No.6player scored a three-point shot |
| 07:35 | No.2player scord a layup | 66-55 | |
| ⋮ | ⋮ | ⋮ | ⋮ |

FIG. 12

SCENE SEGMENT PLAYING SYSTEM, METHOD AND RECORDING MEDIUM THEREOF

CROSS-REFERENCE TO RELATED APPLICATION

This application claims the benefit of Taiwan Patent Application No. 101138298, filed on Oct. 17, 2012, which is hereby incorporated by reference for all purposes as if fully set forth herein.

BACKGROUND OF THE INVENTION

1. Field of Invention

The present invention relates to a scene segment playing system, a scene segment playing method and a recording medium thereof, and more particularly to a scene segment playing system, a scene segment playing method and a recording medium thereof in which a demanded scene segment is retrieved through scene description data.

2. Related Art

In the prior art, media data is usually played in a linear manner. Image playing software supplies a timeline of playing the media data correspondingly. A user can click a position on the timeline or drag a slider on the timeline, so as to determine an image playing segment.

However, if a user is not familiar with the played content of the media data and the timepoint of playing, it takes a long time for the user to find the demanded video scene. Secondly, the precision of dragging a slider depends on the length of a timeline, and the precision of dragging a slider also affects the precision of positioning the timepoint of a demanded image. The longer the timeline is, the higher the precision of dragging a slider is. Therefore, if a user intends to acquire a targeted image or voice from the media data, he/she needs to manually control the timeline to position the slider at the timepoint of a demanded image, so as to play the demanded image.

SUMMARY OF THE INVENTION

To solve the above problems, the present invention discloses a scene segment playing system, a scene segment playing method and a recording medium thereof, in which media is selected according to scene description data to supply and play a demanded scene segment of a user.

The scene segment playing system disclosed in the present invention includes media supply equipment, a description generating server, a scene server and a first end device.

The media supply equipment is used for supplying media data. The first end device is used for inputting interval information. The description generating server is used for receiving the media data to supply scene description data corresponding to the media data. The scene server is used for acquiring the interval information, retrieving scene segment data from the media data according to a comparison result of comparing the interval information and the scene description data, and outputting the scene segment data to the first end device for playing.

The scene segment playing method disclosed in the present invention includes: supplying, by media supply equipment, media data; receiving, by a description generating server, the media data, and supplying scene description data corresponding to the media data; acquiring, by a scene server, interval information supplied by a first end device; retrieving, by the scene server, scene segment data from the media data according to a comparison result of comparing the interval information and the scene description data; and, outputting, by the scene server, the scene segment data to the first end device for playing.

In addition, the present invention also discloses a recording medium, which stores a program code readable by an electronic device. When reading the program code, the electronic device executes a scene segment playing method. The method is as described above.

The feature of the present invention lies in that in the present invention, by means of comparison between the scene description data and the interval information, the demanded scene segment data of the user can be supplied in a targeted manner, and the user can find the demanded video scene within a relatively short time. Secondly, the user can acquire the demanded scene segment data without spending much time in controlling the timeline of the media data, so that the precision of supplying scene video can be maintained, the complexity of image control can be reduced, and the operational trouble that it is difficult for the user to drag a slider to a demanded point is avoided. Thirdly, by means of targeted retrieval of segment data, the user can acquire demanded scene segments once for all to form self-generated media, and proper media abstract information can also be further generated for media data, so that not only the customized media operation that satisfies the demand of the user is formed, but also the operational complexity for the user is reduced. Fourthly, by means of supplying the scene segment data and comparison between the scene description data and the interval information, the user can make personalized choices to watch demanded segments, so that high flexibility in media operations is achieved.

BRIEF DESCRIPTION OF THE DRAWINGS

The present invention will become more fully understood from the detailed description given herein below for illustration only, and thus are not limitative of the present invention, and wherein:

FIG. 12 is a schematic view of scene description information according to an embodiment of the present invention;

DETAILED DESCRIPTION OF THE INVENTION

Preferred embodiments of the present invention are described in detail below with reference to the accompanying drawings.

Figure 1:
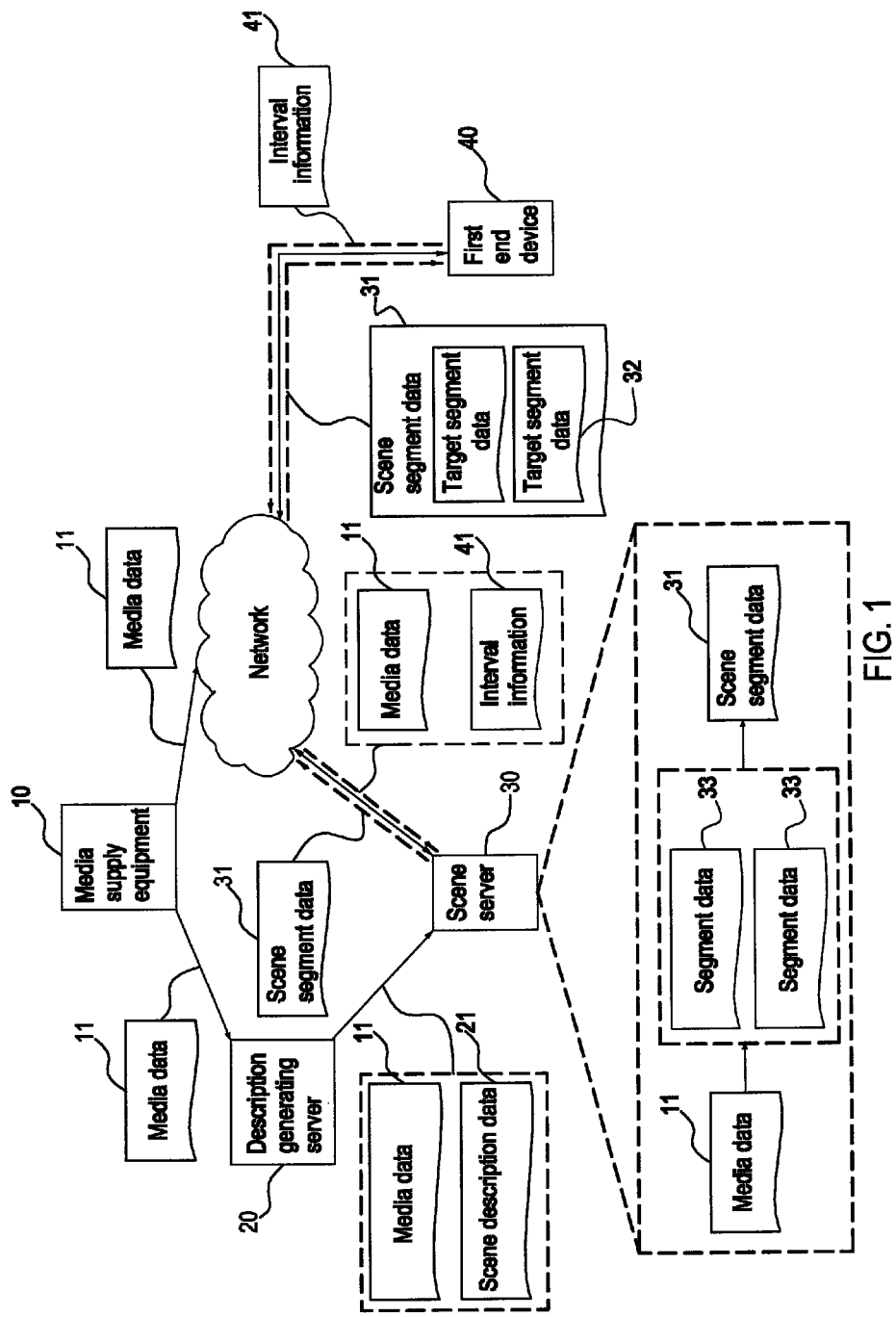
FIG. 1 is a schematic structural view of a scene segment playing system according to an embodiment of the present invention.

FIG. 1 is a schematic structural view of a scene segment playing system according to an embodiment of the present invention. Referring to FIG. 1, the system is applicable to a device, equipment or system with a media playing capability, and the configuration form is not limited. The scene segment playing system includes a client side and a server side, and equipment and devices at the two sides are connected via a network. The server side includes media supply equipment 10, a description generating server 20 and a scene server 30. The client side includes more than one end device, which is an electronic device of a user, for example, an electronic device having a human-machine interface for being operated by a user and having a network connection capability, such as a personal computer (PC), a notebook computer, a tablet PC (Tablet PC), a smart phone, and a set-top box (STB). In this example, a first end device 40 is used for illustration.

The media supply equipment 10 is used for supplying media data 11. The media data 11 may be a complete image, voice or video data, or stream data transmitted in real time. The media supply equipment 10 may be equipment at the same place as the description generating server 20 and the scene server 30, or third-party equipment at a different place, which is not limited. The modes that the media supply equipment 10 outputs the media data 11 include wired and wireless data transmission modes such as broadcast, broadband, wired transmission (for example, Community Antenna Television, Community Antenna Television, Cable Television, CATV), network protocol transmission (IPTV), which is also not limited.

The media supply equipment 10 includes hardware having a media supply capability, or a combination of more than at least one form of a unit, component, device, equipment and system in which software and hardware are combined. The media data 11 includes multiple same or different scene segments. For example, when the media data 11 is image data, the image data refers to image segments having more than one of contents such as targets, scenes and characters. For example, the media data 11 is voice data, and the voice data refers to voice segments having more than one of contents such as high pitch, low pitch, speeches and music.

When acquiring the media data 11, the description generating server 20 supplies scene description data 21 corresponding to the media data 11. The scene description data 21 is annotation data for annotating the playing content of the media data 11, for example, the similar data for further describing the scene segment such as brief introduction of the scene playing content of the media data 11, the scene playing time, and the scene title. The modes of supplying the scene description data 21 are as follows: (1) the description generating server 20 directly generates the scene description data 21 according to the scene playing content of the media data 11; and (2) the description generating server 20 acquires the scene description data 21 corresponding to the media data 11 from an external device.

The first end device 40 includes a data input interface for a user to input data, and also has a media playing capability. The presentation end of the interface of the first end device 40 depends on the demands of designers, and is not limited. A user inputs interval information 41 by using the first end device 40.

The interval information 41 refers to a request condition input by a user when the user intends to search for a specific scene segment from the media data 11. For example, the media data 11 is recorded images of a basketball game, a user inputs a request condition such as scoring pictures of his favorite players or scoring pictures of three-point shots of all players in the game or scoring pictures of three-point shots of his favorite players. Further, for example, the media data 11 is music data of an opera, and a user inputs a request condition such as solos of a female protagonist of the opera or absolute music segment performance. Even further, when a user already knows the content of the media data 11, the user can also input more than one time interval as the reference of searching for a scene segment.

The scene server 30 acquires the interval information 41 and the media data 11, but the source of acquiring the media data 11 is the description generating server 20 or the media supply equipment 10. The scene server 30 compares the interval information 41 and the scene description data 21, retrieves scene segment data 31 from the media data according to a comparison result, and outputs the scene segment data 31 to the first end device 40 for playing.

However, the types of the request condition included in the interval information 41 are illustrated as follows:

(1) The interval information 41 includes a start time and an end time. The scene server 30 compares the interval information 41 and the scene description data 21, acquires more than one scene playing time between the start time and the end time from the scene description data 21, and retrieves more than one piece of target segment data 32 from the media data 11 according to the scene playing time, so as to form the scene segment data 31. However, the target segment data 32 may be retrieved from the media data 11 according to the intervals of the scene segments, or is retrieved by directly cutting the media data 11 without considering the intervals of the scene segments in the media data 11.

(2) The interval information 41 includes content designation information. When comparing the interval information 41 and the scene description data 21, the scene server 30 acquires a scene playing content that meets the content designation information from the scene description data 21, and retrieves more than one piece of target segment data 32 from the media data 11 according to the scene playing content, so as to form the scene segment data 31.

(3) The scene server 30 first divides the media data 11 into more than one piece of segment data 33 according to record information (the playing content, playing time, or other correlated information) of the scene description data 21. The interval information 41 includes content designation data. When comparing the content designation data and the record information of the scene description data 21, the scene server 30 retrieves more than one piece of target segment data 32 from all the segment data 33 to form the scene segment data 31.

(4) The scene server 30 divides the media data 11 into a plurality of pieces of segment data 33 according to record information of the scene description data 21. The interval information 41 includes timepoint data. The scene server 30 compares the timepoint data and a playing start time and a playing end time of each piece of segment data 33 to retrieve at least one piece of target segment data 32 from each piece of segment data 33, where the scene playing time of the target segment data 32 includes the timepoint data. The scene server 30 forms the scene segment data 31 with the retrieved target segment data 32.

Also, the interval information 41 may include more than one type of request condition, and may also include multiple different retrieval demand request conditions. The scene server 30 may form one or more pieces of scene segment data 31 from the media data 11 according to each request condition.

Upon receiving one or more pieces of scene segment, data 31, the first end device 40 performs playing or presents a list. The user selects one or more pieces of scene segment data 31 for playing through a control interface of the first end device 40.

Moreover, one or more pieces of self-generated media may be generated from the scene segment data 31 according to similar rules such as the playing order and playing time of the media data 11 and the order of the request conditions. However, the rule is selected by the first end device 40 according to a playing program or setting values of software, or is input and set by the user through a control interface, which is not limited.

Furthermore, the scene server 30 divides the media data 11 into one or more pieces of segment data 33 according to the record information of the scene description data 21, and then generates a media playing tree structure from the segment data 33 according to the data dependency, data attribute and data level relationship of each piece of segment data 33. When acquiring the interval information 41, the scene server 30 retrieves relevant segment data 33 from the media playing tree structure according to the interval information 41 to form the scene segment data 31.

However, the interface of the first end device 40 also presents an input field of the media playing tree structure, so that the user inputs each request condition in each field only according to the data dependence relationship of the request condition or the type of the data attribute, where each request condition is used as a reference for the scene server 30 to retrieve and categorize the segment data 33.

However, the media supply equipment 10 may also supply a plurality of pieces of media data 11, and the description generating server 20 supplies scene description data 21 corresponding to each piece of media data 11. When inputting the interval information 41 by using the first end device 40, the user may set a different request condition for each piece of media data 11 or set one request condition for all the media data 11, which depends on demands of the user.

The scene server 30 compares the relevant scene description data 21 and the interval information 41, and forms one or more pieces of segment data 33 from each piece of media data 11, so as to return the segment data 33 to the first end device 40. Then, self-generated media that meets demands of the user may be generated by the user from the acquired segment data 33 through the first end device 40.

However, the retrieval results such as the segment data 33, the scene description data 21, the media playing tree structure, and the playing media may be stored in the scene server 30 for use by the scene segment data 31 during the supply operation next time. Moreover, the scene segment data 31 generated through the scene segment supply operation may also be stored in the first end device 40 to be directly obtained and played by playing software/hardware of the first end device 40.

Figure 2:
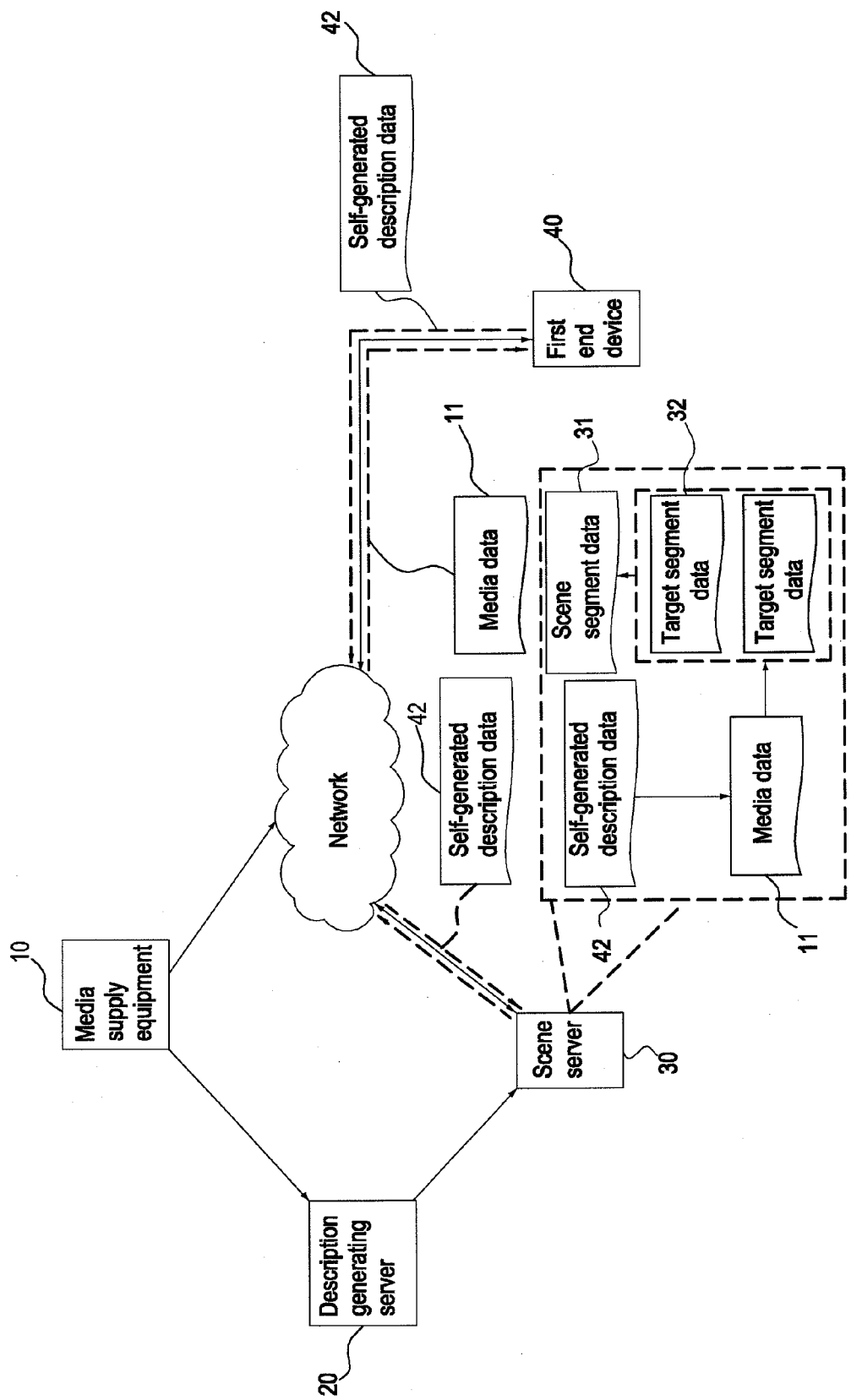
FIG. 2 is a schematic view of data flows of self-generated description data according to an embodiment of the present invention.

FIG. 2 is a schematic view of data flows of self-generated description data according to an embodiment of the present invention. Referring to FIG. 2, in this example, the first end device 40 also acquires the media data 11 supplied by the media supply equipment 10 and plays the media data 11. During the playing, the user may retrieve segments from the media data 11 during playing through the control interface of the first end device 40, so as to form more than one retrieved segment and establish first self-generated description data 42 corresponding to the retrieved segments. The first self-generated description data 42 includes a first segment playing time, which includes the playing start time and the playing end time of the retrieved segment (or segments) in the media data 11. The scene server 30 then retrieves at least one piece of target segment data 32 within the first segment playing time from the media data 11 according to the first self-generated description data 42, so as to form scene segment data 31 with the pieces of target segment data 32, and makes the first self-generated description data 42 correspond to the scene segment data 31. The formed scene segment data 31 may be supplied to other end devices.

Figure 3:
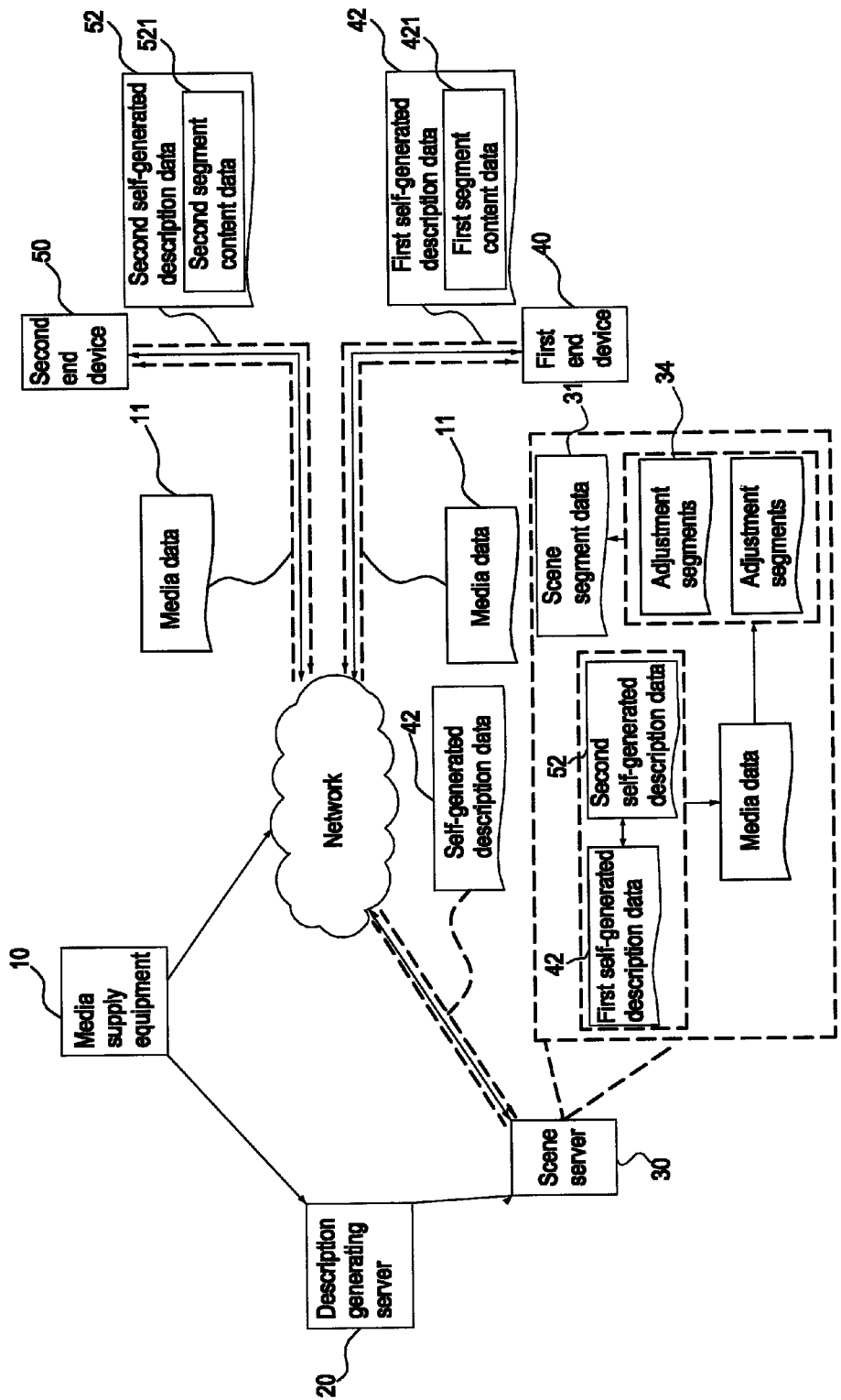
FIG. 3 is a schematic view of modified data flows of scene segment data according to an embodiment of the present invention.

FIG. 3 is a schematic view of modified data flows of scene segment data according to an embodiment of the present invention. The difference between FIG. 3 and FIG. 2 lies in that, the system further includes a second end device 50. The first self-generated description data 42 further includes first segment content data 421, which includes the playing content of the scene segment data 31 corresponding to the first self-generated description data 42.

The same as the operations of the first end device 40, the second end device 50 may also acquire the media data 11. Also, another user may retrieve segments from the media data 11 during playing through a control interface of the second end device 50, so as to form more than one retrieved segment and establish second self-generated description data 52 corresponding to the retrieved segments. The second self-generated description data 52 includes a second segment playing time and second segment content data 521. The second segment playing time includes the playing start time and the playing end time of the retrieved segment (or segments) in the media data 11. The second segment content data 521 is the playing content of the retrieved segment.

When the scene server 30 acquires the second self-generated description data 52, if the scene server 30 determines that the first segment content data 421 and the second segment content data 521 are the same or equivalent and the first segment playing time and the second segment playing time are different, the scene server 30 sets a playing modification time according to the first segment playing time and the second segment time, so as to retrieve a plurality of adjustment segments 34 whose playing time is within the playing modification time from the media data 11 and update the scene segment data 31.

The playing modification time is the union or intersection of the time lengths of the first segment playing time and the second segment playing time. Alternatively, the start time of the playing modification time is the average value of the start time of the first segment scene playing time and the start time of the second segment scene playing time. The end time of the playing modification time is the average value of the end time of the first segment scene playing time and the end time of the second segment scene playing time. Alternatively, other relevant or similar setting manners may be adopted, and the present invention is not limited to the above setting manners and depends on the demands of designers.

Figure 4:
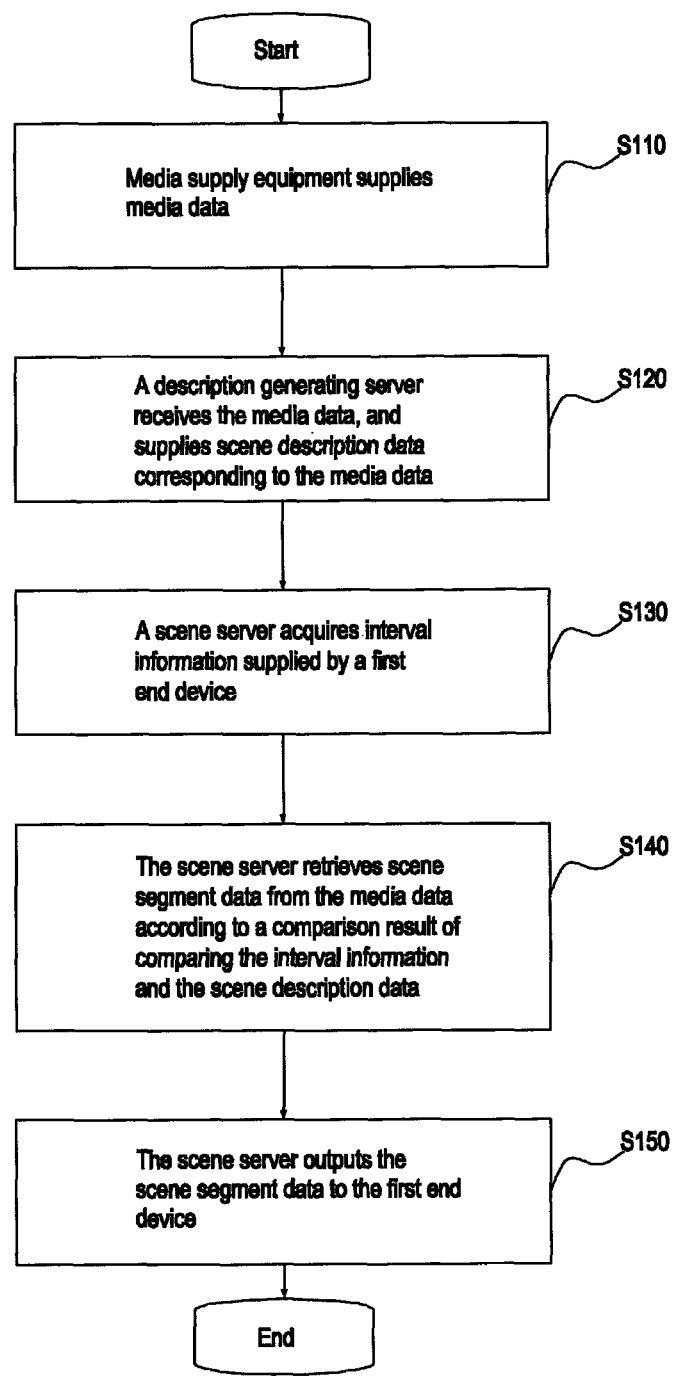
FIG. 4 is a schematic flow chart of a scene segment playing method according to an embodiment of the present invention.

FIG. 4 is a schematic flow chart of a scene segment playing method according to an embodiment of the present invention; and FIG. 5 to FIG. 8 are detailed schematic flow charts of a scene segment playing method according to an embodiment of the present invention. Please refer to FIG. 1 to FIG. 3 in combination for ease of understanding. The process of the method is as follows.

Media supply equipment 10 supplies media data 11 (Step S110). As described above, the media data 11 supplied by the media supply equipment 10 may be a complete image, voice or video data, or stream data transmitted in real time. The modes of transmitting the media data 11 include wired and wireless data transmission modes such as broadcast, broadband, wired transmission, and network protocol transmission.

A description generating server 20 receives the media data 11, and supplies scene description data 21 corresponding to the media data 11 (Step S120). As described above, the manners of supplying the scene description data 21 include: (1) the description generating server 20 directly generates the scene description data 21 according to the playing content of the media data 11; and (2) the scene description data 21 corresponding to the media data 11 is acquired from an external device.

A scene server 30 acquires interval information 41 supplied by a first end device 40 (Step S130). The interval information 41 refers to a request condition input by a user when the user intends to search for a specific media segment from the media data 11. The request condition is at least one of the content designation, the playing start time and playing end time, and timepoint designation.

Figure 5:
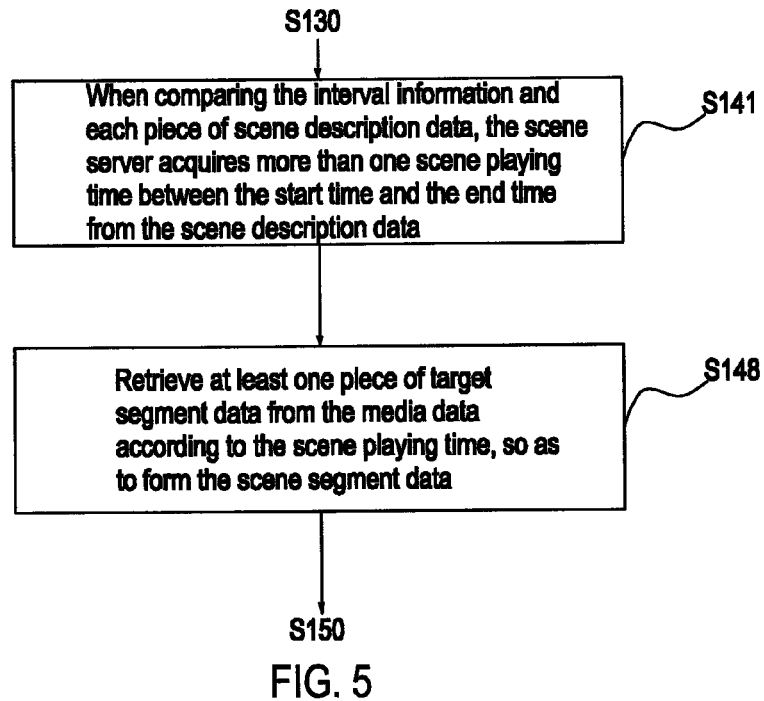
FIG. 5 to FIG. 8 are detailed schematic flow charts of a scene segment playing method according to an embodiment of the present invention.

The scene server 30 retrieves scene segment data 31 from the media data 11 according to a comparison result of comparing the interval information 41 and the scene description data 21 (Step S140). In this step, according to different request conditions included in the interval information 41, the scene server 30 may also retrieve the scene segment data 31 in different modes. The illustration is as follows:

(1) As shown in FIG. 1 and FIG. 5, the interval information 41 includes a start time and an end time. In this step, when comparing the interval information 41 and each piece of scene description data 21, the scene server 30 acquires more than one scene playing time between the start time and the end time from the scene description data 21 (Step S141). Subsequently, the scene server 30 retrieves more than one piece of target segment data 32 from the media data 11 according to the scene playing time, so as to form the scene segment data 31 (Step S148).

Figure 6:
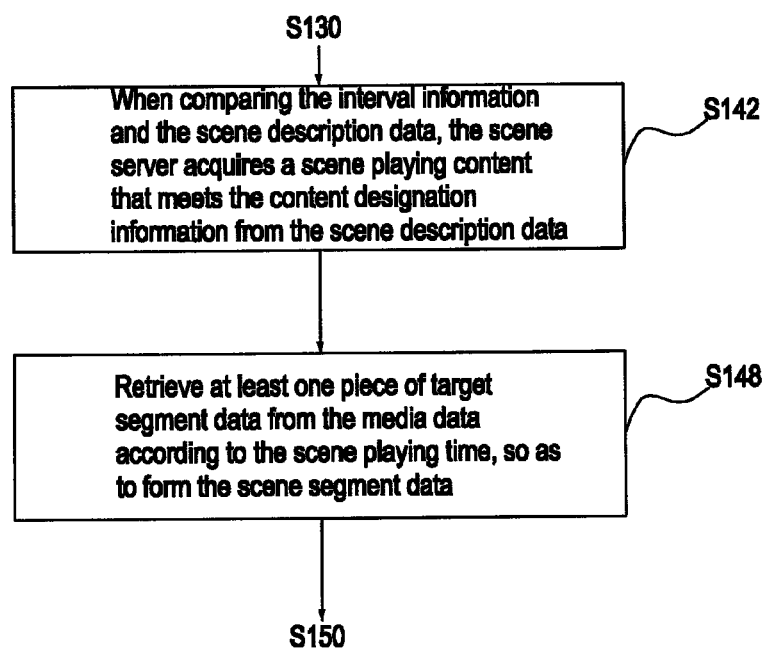

(2) As shown in FIG. 1 and FIG. 6, the interval information 41 includes content designation information. In this step, when comparing the interval information 41 and the scene description data 21, the scene server 30 acquires a scene playing content that meets the content designation information from the scene description data 21 (Step S142). Subsequently, the scene server 30 retrieves more than one piece of target segment data 32 from the media data 11 according to the scene playing content, so as to form the scene segment data 31 (Step S148).

Figure 7:
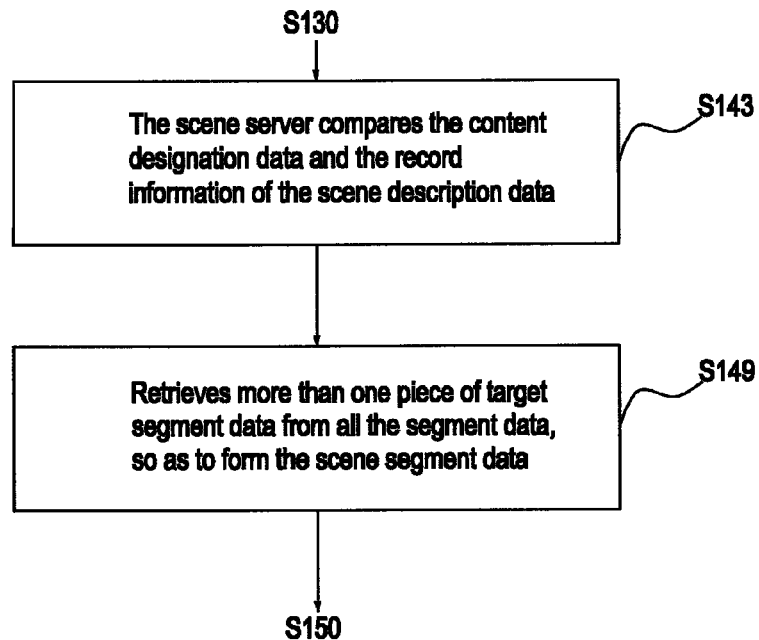

(3) As shown in FIG. 1 and FIG. 7, the scene server 30 divides the media data 11 into more than one piece of segment data 33 according to record information of the scene description data 21. The interval information 41 includes content designation data. In this step, the scene server 30 compares the content designation data and the record information of the scene description data 21 (Step S143), and retrieves more than one piece of target segment data 32 from all the segment data 33, so as to form the scene segment data 31 (Step S149).

Figure 8:
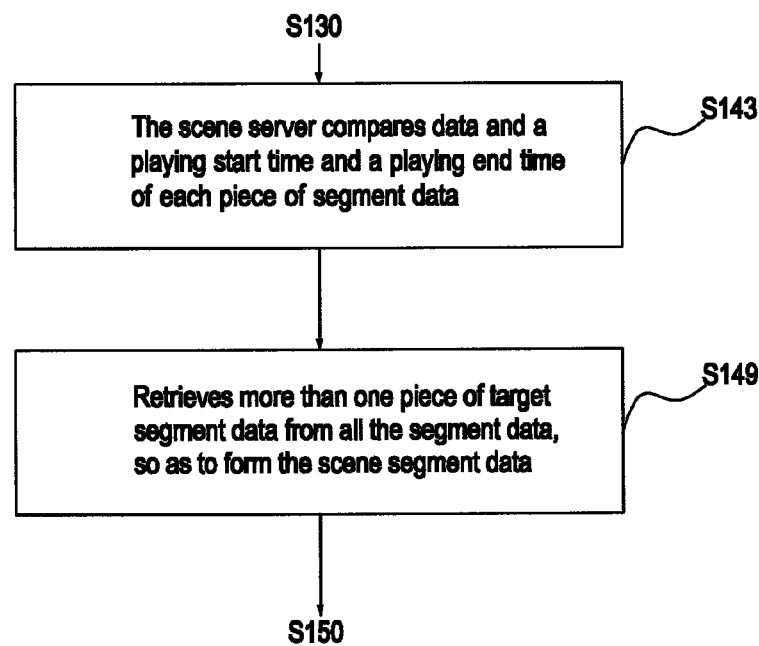

(4) As shown in FIG. 1 and FIG. 8, the scene server 30 divides the media data 11 into a plurality of pieces of segment data 33 according to record information of each piece of scene description data 21. The interval information 41 includes timepoint data. In this step, the scene server 30 compares timepoint data and a playing start time and a playing end time of each piece of segment data 33 (Step S144), and retrieves at least one piece of target segment data 32 from all the segment data 33, so as to form the scene segment data 31 (Step S149).

Subsequently, the scene server 30 outputs the scene segment data 31 to the first end device 40 (Step S150). Upon receiving one or more pieces of scene segment data 31, the first end device 40 plays the scene segment data 31 or presents a list. A user then selects one or more pieces of scene segment data 31 for playing through the control interface of the first end device 40.

Figure 9:
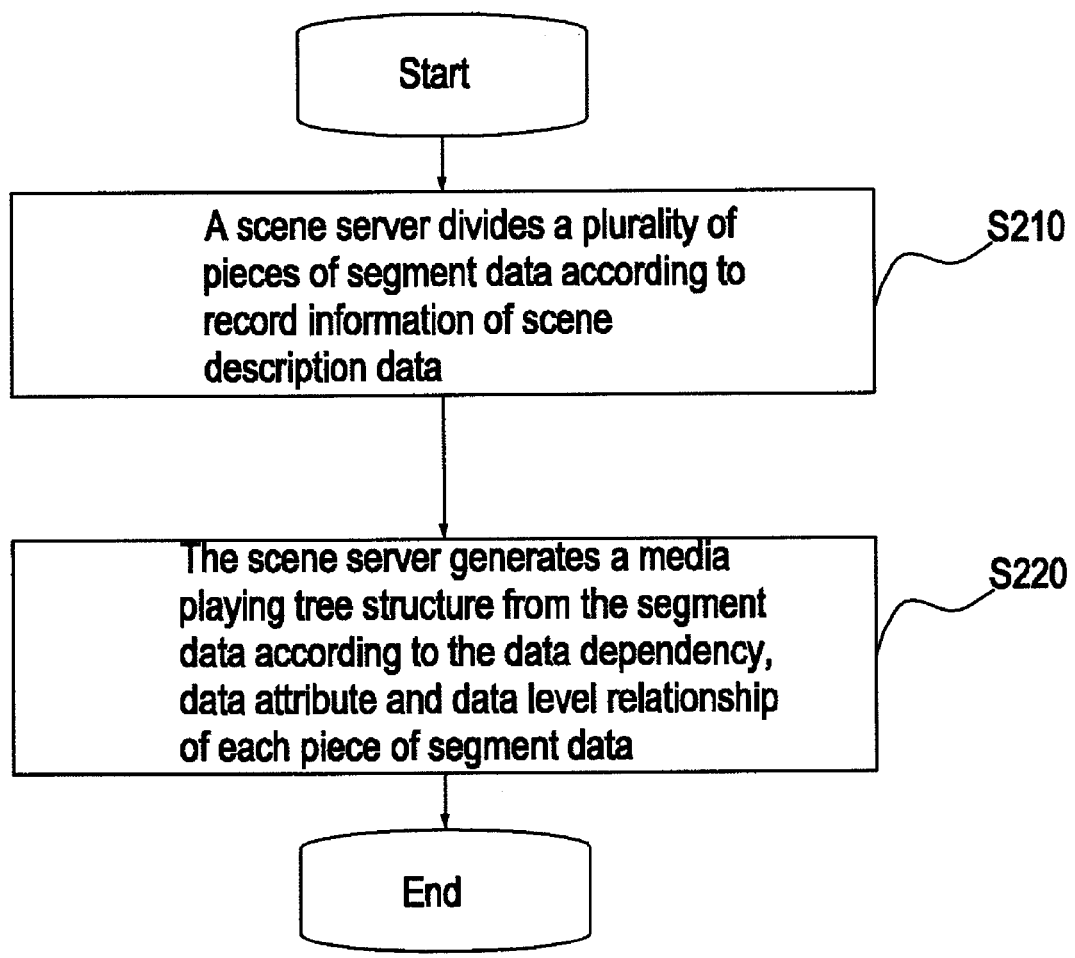
FIG. 9 is a schematic flow chart of generating a media playing tree structure according to an embodiment of the present invention.

FIG. 9 is a schematic flow chart of generating a media playing tree structure according to an embodiment of the present invention. Please refer to FIG. 1 in combination for ease of understanding. The method includes the following steps.

A scene server 30 divides a plurality of pieces of segment data 33 according to record information of scene description data 21 (Step S210).

The scene server 30 generates a media playing tree structure from the segment data 33 according to the data dependency, data attribute and data level relationship of each piece of segment data 33 (Step S220).

In Step S140, when acquiring the interval information 41, the scene server 30 retrieves the segment data 33 from the media playing tree structure according to the interval information 41, so as to form the scene segment data 31.

Figure 10:
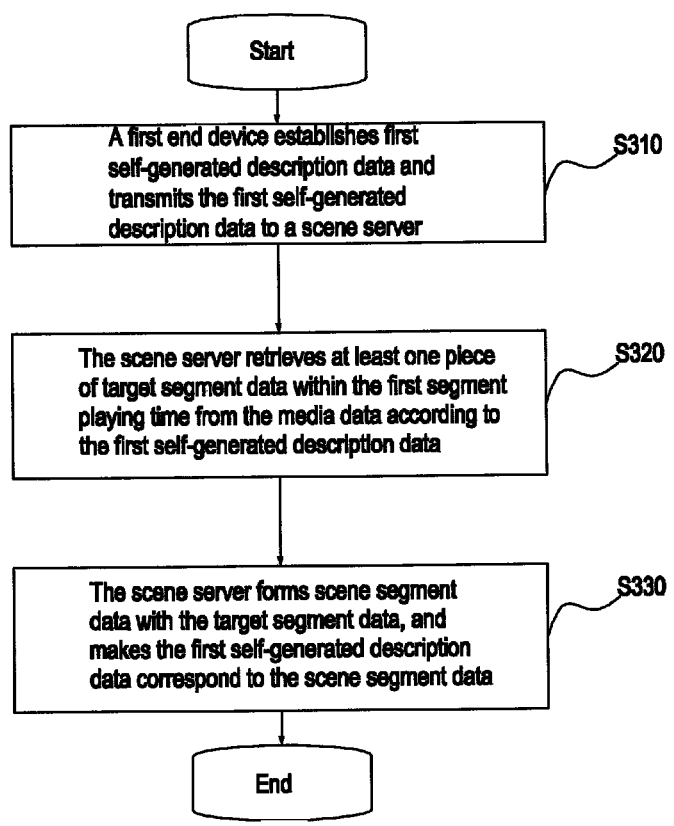
FIG. 10 is a schematic flow chart of a method for self-generating description data according to an embodiment of the present invention.

FIG. 10 is a schematic flow chart of a method for self-generating scene description data according to an embodiment of the present invention. Please refer to FIG. 2 in combination for ease of understanding. The method includes the following steps.

A first end device 40 establishes first self-generated description data 42 and transmits the first self-generated description data 42 to a scene server 30 (Step S310). The first self-generated description data 42 includes a first segment playing time of more than one retrieved segment in the media data 11, which includes the playing start time and the playing end time of the retrieved segment (or segments).

The scene server 30 retrieves at least one piece of target segment data 32 within the first segment playing time from the media data 11 according to the first self-generated description data 42 (Step S320).

The scene server 30 forms scene segment data 31 with the target segment data 32, and makes the first self-generated description data 42 correspond to the scene segment data 31 (Step S330).

Figure 11:
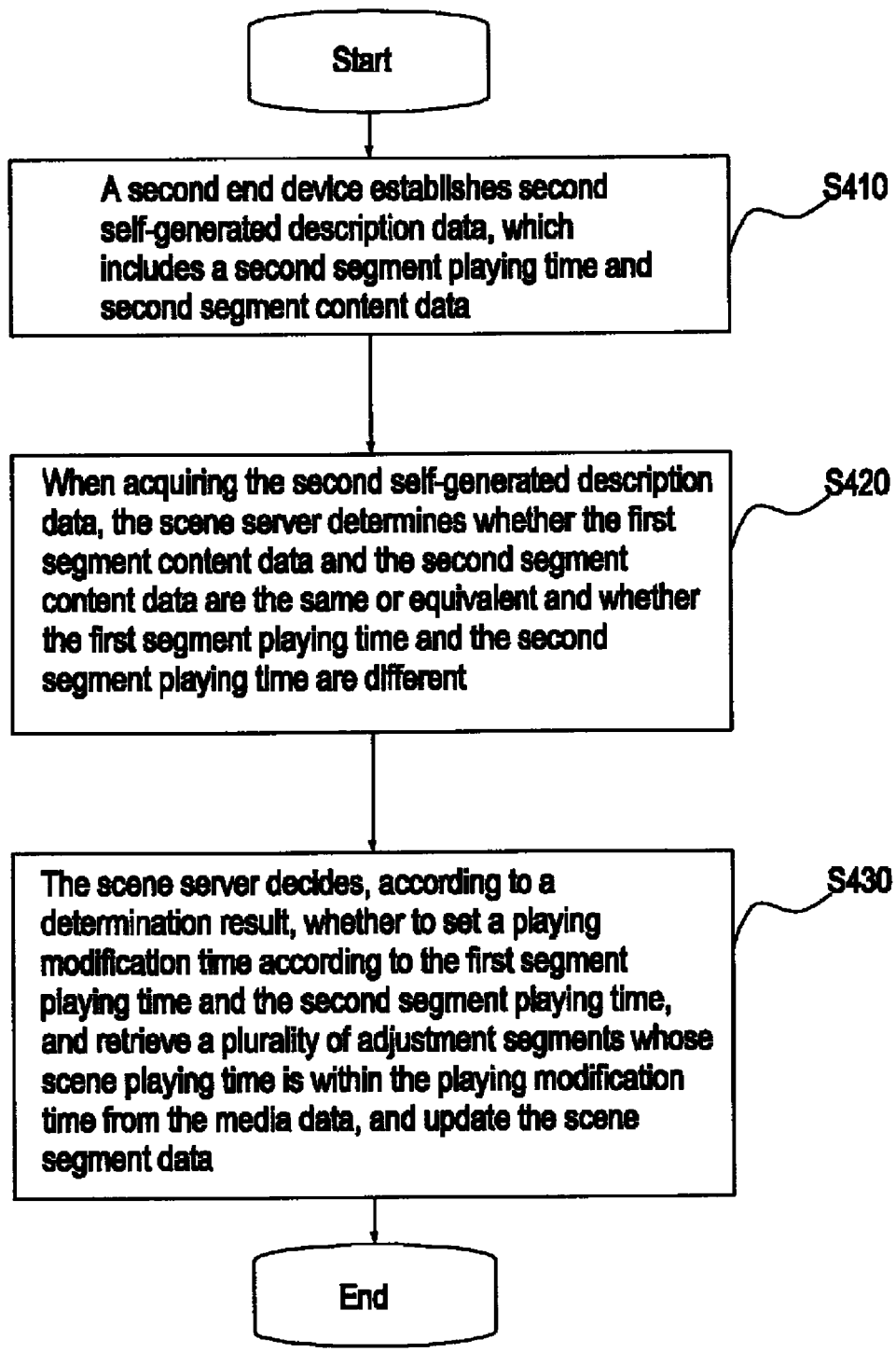
FIG. 11 is a schematic flow chart of a method for modifying scene segment data according to an embodiment of the present invention.

FIG. 11 is a schematic flow chart of a modified method for self-generating scene description data according to an embodiment of the present invention. Please refer to FIG. 3 and FIG. 10 for ease of understanding. The method includes the following steps.

A second end device 50 establishes second self-generated description data 52, which includes a second segment playing time and second segment content data (Step S410). The second self-generated description data 52 includes a second segment playing time and second segment content data, and the second segment playing time includes the playing start time and the playing end time of the retrieved segment (or segments) in the media data 11. The second segment content data 521 is the playing content of the retrieved segment.

When acquiring the second self-generated description data 52, the scene server 30 determines whether the first segment content data 421 and the second segment content data 521 are the same or equivalent and whether the first segment playing time and the second segment playing time are different (Step S420).

The scene server 30 decides, according to a determination result, whether to set a playing modification time according to the first segment playing time and the second segment playing time, and retrieve a plurality of adjustment segments 34 whose scene playing time is within the playing modification time from the media data 11, and update the scene segment data 31 (Step S430). The manner of setting the playing modification time is as described above, which is no longer described herein.

Figure 15:
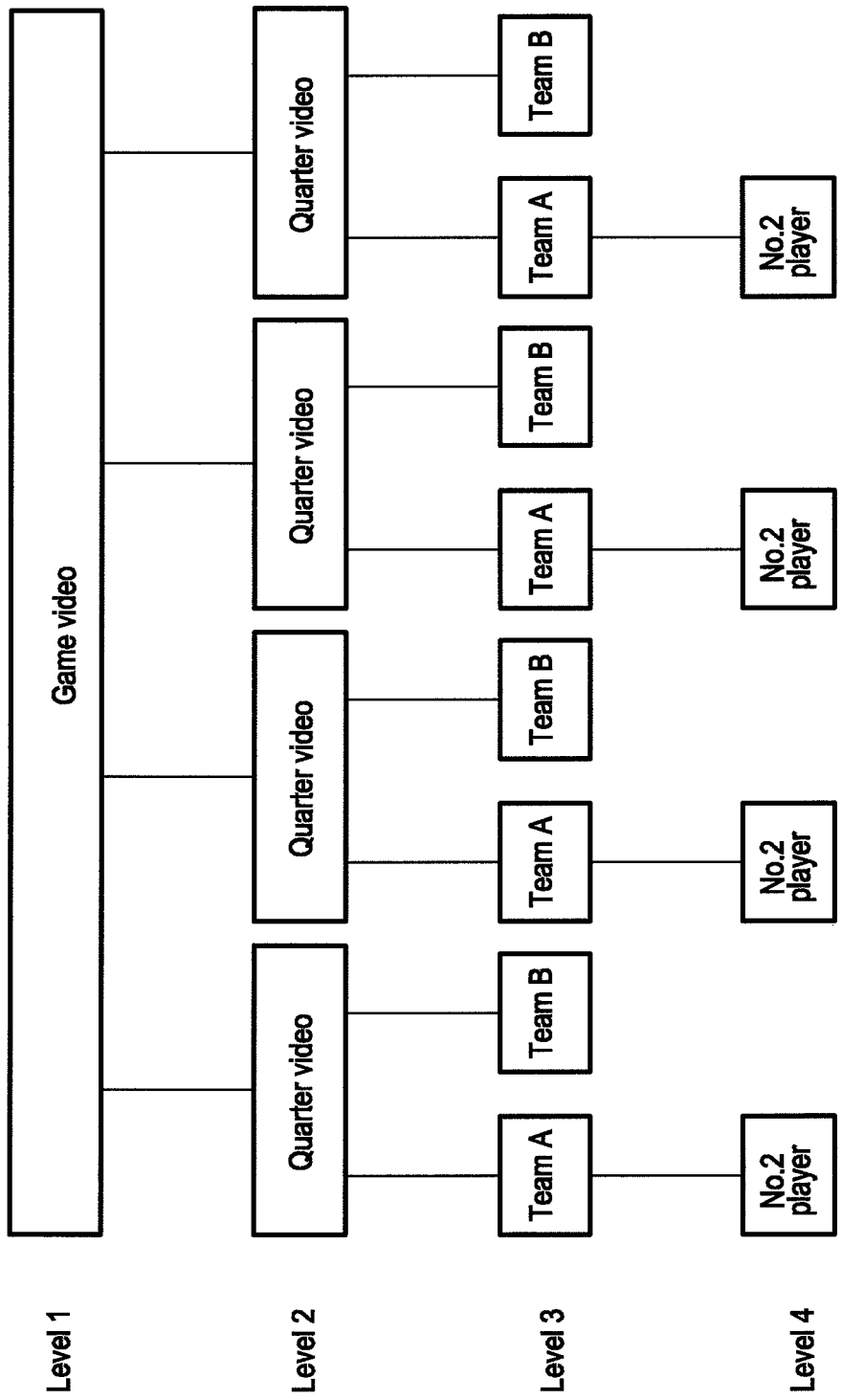
FIG. 15 is a schematic view of a media playing tree structure according to an embodiment of the present invention.

FIG. 12 and FIG. 15 are schematic views of situations of media control according to an embodiment of the present invention. Herein, the media data 11 is described as recorded images of a basketball game.

FIG. 12 is a schematic view of scene description information according to an embodiment of the present invention, in which a scene instruction and a scene corresponding time of images of a basketball game are presented.

When a user merely wants to watch "scoring pictures in the third quarter" and knows the playing timepoint of the "scoring pictures in the third quarter" in the media data 11, this playing timepoint may be directly set in the interval information 41, for example, the countdown of the third quarter "11:39", "10:50", "10:49", "09:39", "09:16", "08:58", "08:44", "08:29", "08:07", "07:47", "07:35", or the relevant timepoints. The scene server 30 uses the time before or after the timepoints or the timepoints as the center to retrieve corresponding scene segment data 31 to be played by the relevant end device.

Alternatively, when the demand condition set by the user is "scoring pictures of three-point shots in the third quarter", the scene server 30 takes the countdown of the third quarter "11:39", "09:16", "08:58", "07:47" and so on and timepoints corresponding to the "scoring scenes of three-point shots in the third quarter". The scene server 30 uses the time before or after the timepoints or the timepoints as the center to retrieve corresponding scene segment data 31 to be played by the relevant end device.

Figure 13:
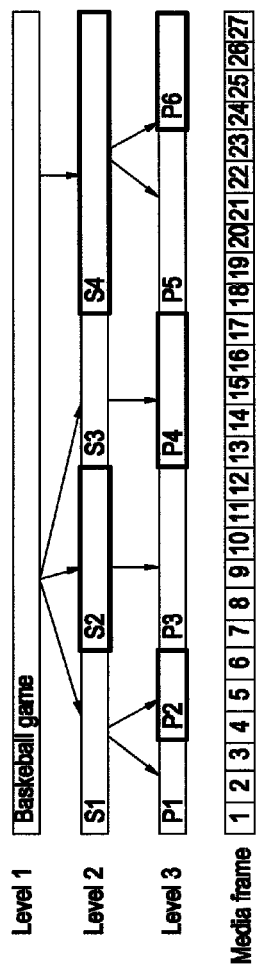
FIG. 13 is a schematic view of media levels according to an embodiment of the present invention.

FIG. 13 is a schematic view of media levels according to an embodiment of the present invention. The recorded images of the basketball game can be divided into different image levels. The highest level refers to images of the whole game, the next level refers to images of all quarters, and the next level refers to images of close-up shots. The whole images are formed of multiple pieces of segment data 33, and correspond to the scene description information 21. However, each level can be regarded as the basis for a media division mode.

Figure 14:
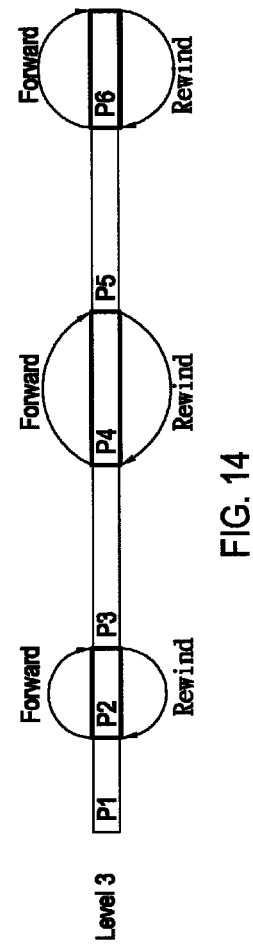
FIG. 14 is a view of playing scene segment data according to an embodiment of the present invention.

FIG. 14 is a view of playing scene segment data according to an embodiment of the present invention. With the media division mode of the third level as an example, the selected scene section media 32 includes segments P1, P3 and P5. The relevant playing software, program or module jumps to the starting point of the segment P3 and starts to play the segment P3 after the segment P1 is played. In the same way, after playing the segment P3, the playing software, program or module jumps to the starting point of the segment P5 and starts to play the segment P5. During media forwarding, the relevant playing software also performs the forwarding operation segment by segment with the segment as a unit, or directly designates segments for performing the forwarding, for example, forwarding from the segment P1 to the segment P5. On the other hand, during image rewinding operation, rewinding from the segment P5 to the segment P3 is performed, and then rewinding from the segment P3 to the segment P1 is performed. Alternatively, the relevant playing software directly designates segments for rewinding, for example, from the segment P5 to the segment P1 or the starting point of the film.

FIG. 15 is a schematic view of a media playing tree structure according to an embodiment of the present invention. Herein, by combining the image levels shown in FIG. 12 and the data dependence relationships or the types of data attributes of the segment data 33 recorded in the scene description data 2, a media playing tree structure may be generated from the segment data 33 of the whole recorded images.

The first level of the media playing tree structure is the whole game image. The second level is branches of the first level images, which are images of both teams. The third level is branches of the second level images, which are close-up images of the two teams in the game. The fourth level is branches of the third level images, which are the close-up shot images of specific players from the two teams in the game.

After the user sets the interval information 41, the scene server 30 retrieves the demanded target segment data 32 from the media data 11 through the media playing tree structure according to the demand condition included in the interval information 41, so as to form the above self-generated image to be played by a relevant playing module.

However, the segment data 33 retrieved by the scene server 30 does not need to consider the above image levels. For example, when the user wants to watch "all scoring pictures of No. 2 player of Team A" and then watch "whole images of the fourth quarter", the scene server 30 retrieves segment data corresponding to "all scoring pictures of No. 2 player of Team A" according to the fourth level structure of the media playing tree structure, retrieves the segment data corresponding to the "whole images of the fourth quarter" according to the second level structure of the media playing tree structure, and then, according to the media retrieval manner, forms the demanded self-generated images of the user to be played by the relevant playing module. That is, the scene server 30 may retrieve the segment data of the same level, different levels or partially the same and partially different levels from the media playing tree structure, and integrate the segment data into scene segments to be played by the end device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scene segment playing system, comprising:
   a media supply equipment, used for supplying media data;
   a description generating server, used for receiving the media data, so as to supply scene description data corresponding to the media data;
   a scene server, used for acquiring interval information and the media data, and according to a comparison result of comparing the interval information and the scene description data, retrieving scene segment data from the media data,
   wherein the scene server divides the media data into a plurality of pieces of segment data according to record information of the scene description data, and generates a media playing hierarchical structure for each piece of segment data according to the data dependency, data attribute and data level relationship of the segment data,
   wherein when acquiring the interval information, the scene server retrieves at least one piece of target segment data from the media playing hierarchical structure according to the interval information to form the scene segment data; and a first end device, used for inputting the interval information, and acquiring and playing the scene segment data.

2. The scene segment playing system according to claim 1, wherein the interval information comprises a start time and an end time, and when comparing the interval information and the scene description data, the scene server acquires at least one scene playing time between the start time and the end time from the scene description data, and retrieves at least one piece of target segment data corresponding to the at least one scene playing time from the media data to form the scene segment data.

3. The scene segment playing system according to claim 1, wherein the interval information comprises content designation information, and when comparing the interval information and the scene description data, the scene server acquires at least one scene playing content that meets the content designation information from the scene description data, and retrieves at least one piece of target segment data corresponding to the at least one scene playing content from the media data to form the scene segment data.

4. The scene segment playing system according to claim 1, wherein the scene server divides the media data into a plurality of pieces of segment data according to record information of the scene description data, the interval information comprises content designation data, and the scene server compares the content designation data and the scene description data, and retrieves at least one piece of target segment data from the pieces of scene segment data to form the scene segment data.

5. The scene segment playing system according to claim 1, wherein the scene server divides the media data into a plurality of pieces of segment data according to record information of the scene description data, the interval information comprises timepoint data, and the scene server compares the timepoint data and a playing start time and a playing end time of each piece of segment data to retrieve at least one piece of target segment data, so as to form the scene segment data.

6. The scene segment playing system according to claim 1, wherein the first end device is used for establishing first self-generated description data and transmitting the first self-generated description data to the scene server, the first self-generated description data comprises a first segment playing time corresponding to the media data, and the scene server retrieves at least one piece of target segment data within the first segment playing time from the media data according to the first self-generated description data to form the scene segment data, and makes the first self-generated description data correspond to the scene segment data.

7. The scene segment playing system according to claim 6, wherein the first self-generated description data comprises first segment content data, the system further comprises a second end device, used for establishing second self-generated description data, the second self-generated description data comprises a second segment playing time and second segment content data, and when acquiring the second self-generated description data, and determining that the first segment content data and the second segment content data are the same or equivalent and the first segment playing time and the second segment playing time are different, the scene server sets a playing modification time according to the first segment playing time and the second segment playing time, so as to retrieve a plurality of adjustment segments whose scene playing time within the playing modification time from the media data and update the scene segment data.

8. The scene segment playing system according to claim 7, wherein the playing modification time is the union or intersection of the time lengths of the first segment scene playing time and the second segment scene playing time.

9. The scene segment playing system according to claim 7, wherein the start time of the playing modification time is the average value of the start time of the first segment playing time and the start time of the second segment playing time, the end time of the playing modification time is the average value of the end time of the first segment playing time and the end time of the second segment playing time.

10. A scene segment playing method, comprising:
supplying, by media supply equipment, media data;
receiving, by a description generating server, the media data, and supplying scene description data corresponding to the media data;
acquiring, by a scene server, interval information supplied by a first end device;
retrieving, by the scene server, scene segment data from the media data according to a comparison result of comparing the interval information and the scene description data;
dividing the media data into a plurality of pieces of segment data according to record information of the scene description data, and generating a media playing hierarchical structure for each piece of segment data according to the data dependency, data attribute and data level relationship of the segment data by the scene server;
retrieving at least one piece of target segment data from the media playing hierarchical structure according to the interval information to form the scene segment data by the scene server, when the scene server acquires the interval information; and
outputting, by the scene server, the scene segment data to the first end device for playing.

11. The scene segment playing method according to claim 10, wherein the interval information comprises a start time and an end time, and the step of retrieving, by the scene server, scene segment data from the media data according to a comparison result of comparing the interval information and each piece of scene description data comprises: when comparing the interval information and the scene description data, acquiring, by the scene server, at least one scene playing time between the start time and the end time in the scene description data; and retrieving, by the scene server, at least one piece of target segment data corresponding to the at least one scene playing time from the media data to form the scene segment data.

12. The scene segment playing method according to claim 10, wherein the interval information comprises content designation information, and the step of retrieving, by the scene server, scene segment data from the media data according to a comparison result of comparing the interval information and each piece of scene description data comprises: when comparing the interval information and the scene description data, acquiring, by the scene server, at least one scene playing content that meets the content designation information from the scene description data; and retrieving, by the scene server, at least one piece of target segment data corresponding to the at least one scene playing content to form the scene segment data.

13. The scene segment playing method according to claim 10, wherein the scene server divides the media data into a plurality of pieces of segment data according to record information of each piece of scene description data, the interval information comprises content designation data, and the step of retrieving, by the scene server, scene segment data from the media data according to a comparison result of comparing the interval information and each piece of scene description data comprises: comparing, by the scene server, the content designation data and the scene description data, and retrieving at least one piece of target segment data from the pieces of scene segment data to form the scene segment data.

14. The scene segment playing method according to claim 10, wherein the scene server divides the media data into a plurality of pieces of segment data according to record information of each piece of scene description data, the interval information comprises timepoint data, and the step of retrieving, by the scene server, scene segment data from the media data according to a comparison result of comparing the interval information and each piece of scene description data comprises: comparing, by the scene server, the timepoint data and a playing start time and a playing end time of each piece of scene segment data to retrieve at least one piece of target segment data, so as to form the scene segment data.

15. The scene segment playing method according to claim 10, further comprising: establishing, by the first end device, first self-generated description data and transmitting the first self-generated description data to the scene server, wherein the first self-generated description data comprises a first segment playing time corresponding to the media data; retrieving, by the scene server, at least one piece of target segment data within the first segment playing time from the media data according to the first self-generated description data; and forming, by the scene server, the scene segment data with the at least one piece of target segment data, and making the first self-generated description data correspond to the scene segment data.

16. The scene segment playing method according to claim 15, wherein the first self-generated description data comprises first segment content data, and the method further comprises:
    establishing, by a second end device, second self-generated description data, wherein the second self-generated description data comprises a second segment playing time and second segment content data;
    when acquiring the second self-generated description data, determining, by the scene server, whether the first segment content data and the second segment content data are the same or equivalent and whether the first segment playing time and the second segment playing time are different; and
    deciding, by the scene server, according to a determination result, whether to set a playing modification time according to the first segment playing time and the second segment playing time, so as to retrieve a plurality of adjustment segments whose scene playing time within the playing modification time from the media data and update the scene segment data.

17. The scene segment playing method according to claim 16, wherein the playing modification time is the union or intersection of the time lengths of the first segment playing time and the second segment playing time.

18. The scene segment playing method according to claim 16, wherein the start time of the playing modification time is the average value of the start time of the first segment playing time and the start time of the second segment playing time, and the end time of the playing modification time is the average value of the end time of the first segment playing time and the end time of the second segment playing time.

19. A non-transitory recording medium, storing a program code readable by an electronic device, and when reading the program code, the electronic device executes a scene segment playing method, and the method comprises the following steps:
    supplying, by media supply equipment, media data;
    receiving, by a description generating server, the media data, and supplying scene description data corresponding to the media data;
    acquiring, by a scene server, interval information supplied by a first end device;
    retrieving, by the scene server, scene segment data from the media data according to a comparison result of comparing the interval information and the scene description data;
    dividing the media data into a plurality of pieces of segment data according to record information of the scene description data, and generating a media playing hierarchical structure for each piece of segment data according to the data dependency, data attribute and data level relationship of the segment data by the scene server;
    retrieving at least one piece of target segment data from the media playing hierarchical structure according to the interval information to form the scene segment data by the scene server, when the scene server acquires the interval information; and
    outputting, by the scene server, the scene segment data to the first end device for playing.

20. The non-transitory recording medium according to claim 19, wherein the method further comprises:
    establishing, by the first end device, first self-generated description data and transmitting the first self-generated description data to the scene server, wherein the first self-generated description data comprises a first segment playing time corresponding to the media data;
    retrieving, by the scene server, at least one piece of target segment data within the first segment playing time from the media data according to the first self-generated description data; and
    forming, by the scene server, the scene segment data with the at least one piece of target segment data, and making the first self-generated description data correspond to the scene segment data.

21. The non-transitory recording medium according to claim 20, wherein the first self-generated description data comprises first segment content data, and the method further comprises:
    establishing, by a second end device, second self-generated description data, wherein the second self-generated description data comprises a second segment playing time and second segment content data;
    when acquiring the second self-generated description data, determine, by the scene server, whether the first segment content data and the second segment content data are the same or equivalent and whether the first segment playing time and the second segment playing time are different; and
    deciding, by the scene server, according to a determination result, whether to set a playing modification time according to the first segment playing time and the second segment playing time, so as to retrieve a plurality of adjustment segments whose scene playing time within the playing modification time from the media data and update the scene segment data.

* * * * *